United States Patent [19]
Cassetta et al.

[11] Patent Number: 6,004,608
[45] Date of Patent: *Dec. 21, 1999

[54] METHOD FOR REDUCING FLEXIBLE PACKAGING PERFORATIONS FROM DRIED PASTA NOODLES

[75] Inventors: James Vincent Cassetta, Pearl River, N.Y.; Francis John Farrell, Madison; Dominick Piccininni, Lodi, both of N.J.

[73] Assignee: Lipton, Englewood Cliffs, N.J.

[*] Notice: This patent is subject to a terminal disclaimer.

[21] Appl. No.: 08/972,431

[22] Filed: Nov. 18, 1997

Related U.S. Application Data

[63] Continuation-in-part of application No. 08/550,123, Oct. 27, 1995, abandoned, and a continuation-in-part of application No. 08/550,125, Oct. 27, 1995, Pat. No. 5,738,896.

[51] Int. Cl.⁶ .................................................. A23L 1/16
[52] U.S. Cl. ...................... 426/557; 426/128; 426/289; 426/451; 426/500; 426/503
[58] Field of Search .................... 426/557, 451, 426/500, 128, 289, 503, 504, 517

[56] References Cited

U.S. PATENT DOCUMENTS

| | | |
|---|---|---|
| 2,352,617 | 7/1944 | Cohen et al. |
| 2,357,585 | 9/1944 | Galvin et al. ............................ 426/394 |
| 2,383,774 | 8/1945 | Cohen et al. |
| 2,576,670 | 11/1951 | Cohen . |
| 3,615,597 | 10/1971 | Durst et al. |
| 3,798,343 | 3/1974 | Vitale ...................................... 426/502 |
| 4,323,585 | 4/1982 | Manser ..................................... 426/394 |
| 4,847,098 | 7/1989 | Langler .................................... 426/102 |
| 4,853,236 | 8/1989 | Langler .................................... 426/102 |
| 4,882,175 | 11/1989 | Ream et al. ................................. 426/5 |
| 4,988,528 | 1/1991 | Tomoda ................................... 426/557 |
| 5,186,969 | 2/1993 | Jor .......................................... 426/500 |
| 5,358,727 | 10/1994 | Yates et al. .............................. 426/512 |
| 5,410,857 | 5/1995 | Utley ......................................... 53/410 |

FOREIGN PATENT DOCUMENTS 1594713  8/1981  United Kingdom .

OTHER PUBLICATIONS

Baroni, D., "Chapter 10—Manufacture of Pasta Products", *Macaroni Products, Manufacture, Processing and Packaging*, by Dr. Charles Hummel, London, Food Trade Press Ltd., (1966) pp. 191–203.

Hummel, C., "Chapter 3—Ingredients Used in the Manufacture of Macaroni Products", *Macaroni Products, Manufacture, Processing an Packaging*, London, Food Trade Press Ltd., (1966) pp. 15–21.

Hummel, C., *Macaroni Products, Manufacture, Processing and Packaging*London, Food Trade Press Ltd., (1966) pp. 1–6.

*Primary Examiner*—Lien Tran
*Attorney, Agent, or Firm*—James J. Farrell

[57] ABSTRACT

A flexible packaging system containing spiral wound instant pasta noodles along with a system for packing the noodles in flexible envelopes to reduce breakage of the noodles to permit inclusion of noodles longer than the flexible package filling aperture and reducing the incidence of perforation of the package.

3 Claims, No Drawings

METHOD FOR REDUCING FLEXIBLE PACKAGING PERFORATIONS FROM DRIED PASTA NOODLES

RELATED DOCUMENTS

This application is a continuation in part application of both Ser. No. 08/550,123 filed Oct. 27, 1995 now aban. and Ser. No. 08/550,125 filed Oct. 27, 1995, now U.S. Pat. No. 5,738,896.

BACKGROUND OF THE INVENTION

1. Field of the Invention

This invention relates to a novel system for reducing perforations in flexible packaging which contains dried pasta noodles by employing selected space-saving shapes of instant pasta noodles as well as methods for preparing both the noodles and the packaged noodles.

2. Description of the Related Art

Generally dry or dehydrated foods are contained in bags or flexible packaging for convenience and ease of opening such as in U.S. Pat. Nos. 5,410,857 and 2,357,585. Dry soups frequently employ noodles or pasta as a major portion of the soup and if the noodles or pasta is cut into small straight pieces prior to drying, the ends of the dried material are relatively sharp and when introduced into the package, can easily perforate the packaging material. One solution to prevent this is to make the packaging from relatively strong flexible material, however, this is needlessly expensive and the use of any such material must be balanced against the overall cost of the product. Cheaper packaging material being clearly more desirable than expensive material. A method of including dried pasta in a flexible package while limiting the perforations of the packaging is thus seen to be desirable.

Accordingly, it is an object of the present invention to provide a system employing a spiral pasta shape for use with a flexible package system which substantially reduces the perforations of the flexible packaging containing the pasta.

Over the years there have been many methods for making farinaceous products and for making such products in various shapes. Some of the pasta is made into nests and skeins and this is mentioned in chapter 10 entitled "Manufacture of Pasta Products", by Dante Baroni, pp. 191–203 in a book by Dr. Charles Hummel entitled Macaroni Products, Manufacture, Processing and Packaging, 1966, London, Food Trade Press Inc. In essence, these noodles are prepared to be cooked in a cooking pot containing boiling water and the like and served.

U.S. Pat. No. 4,323,585 relates to a process for producing pasta products in serving portions in packages. This patent refers to nests and other pasta products packed on the basis of eating portions.

U.S. Pat. No. 3,798,343 relates to a process for preparing frozen rolled lasagna. Generally the process used is one where cheese and meat are applied to one face of the single noodle which is then rolled in a spiral and frozen.

U.S. Pat. No. 4,988,528 relates to preparing instant noodles adapted to be cooked in boiling water or the like and then served. This patent particularly relates to fried noodles.

Although many ways of preparing pasta are known, and although many shapes are available, in the art of preparing noodles for instant dishes which noodles are then contained in flexible packaging, for instance, it is difficult to obtain long noodles which can fit within the package since the package is relatively short. Thus, there is a need for a noodle shape which will allow placement into a package of relatively short dimensions. In addition, perforation of the packages can result from the sharp corners of cut noodles.

Spiral shapes are well known, for example, U.S. Pat. No. 4,882,175 employs a rolled tape of a confectionery such as bubble gum. In addition, in the baking industry several patents deal with preparing dough in a rolled spiral form such as, for example, U.S. Pat. No. 2,352,617. Instant noodles, however, present completely different problems from preparing dough into a cinnamon bun shape or into rolls of bubble gum. This is so principally because the pasta first must be prepared and precooked to a certain degree, then spiral rolled, then packed into relatively flexible packaging and when cooked, it must be capable of unrolling to its original length without sticking together. Thus, simply rolling pasta into a spiral formation would not permit unrolling upon cooking. The noodles would stick together in a disc and not unroll.

Conventional instant noodles are manufactured by preparing a dough which is then formed into a strip by multistage rolls. The strip is steamed to partially cook it, gelatinize it and improve its elasticity. It is then cut in the longitudinal direction and subsequently chopped to the appropriate length, dried, and introduced into an appropriate package either alone or with other materials to constitute instant noodles or for example, instant soup. This method, however, leaves many sharp ends of noodles which can perforate the package.

SUMMARY OF THE INVENTION

When pasta is prepared in spiral shapes as disclosed in copending application Ser. No. 08/550,125, it can easily be used in dried products to be filled into flexible packages while reducing the number of perforated packages by eliminating many sharp edges.

A method for reducing the number of perforations of flexible packaging containing dried pasta is disclosed comprising preparing a dried pasts dough by dry blending a flour with a dough conditioning/antisticking agent for about five minutes. Water is then added to the dry blend to achieve a raw dough moisture of about 25%. The moistened mass is then mixed to form the raw dough. The raw dough is worked to achieve a functional thickness and texture. The worked raw dough is partially cooked for about three minutes at a temperature of about 100° C. to pregelantinize the starch in the dough. The partially cooked dough is then partially dried to achieve a moisture content of about 20% and dusted with about 0.1% of a fibrous dusting agent. The dough is then rolled to form a spiral and cut into an appropriate thickness. The cut spirals are then dried to form a spiral pasta noodle and packed in a flexible package which may then be sealed.

Flexible packaging can be prepared by means well known in the art, for example, by the method of U.S. Pat. No. 5,410,857. Once the packaging is prepared, the dried pasta containing food stuff is loaded directly into the formed envelope.

Spiral wound pasta noodle units are prepared which are capable of separating into at least one long strand of pasta when subjected to boiling temperatures by having an antisticking and a dough conditioning agent incorporated into the composition and an anti-sticking agent dusted onto the surface of the dough before rolling to substantially prevent sticking together of the spiral upon subsequent cooking.

The flexible packaging material is first prepared by equipment well known in the art, for example, U.S. Pat. No. 5,410,857. The material then passes into form, fill and seal equipment by any convenient means such as rollers or the like. The dried bulk product containing the spiral pasta noodles is introduced into the flexible envelopes formed through the filler funnel. The filled envelopes thus prepared will experience less perforations because there are fewer sharp ends.

In addition, to reducing perforations by employing a spiral shape, noodles longer than the filling opening of the envelope can be added in the dry mix to the flexible packaging.

Packaging Material:

The flexible packaging material may be any paper-like material such as any of the standard flexible films known in the art for example, films, paper laminates, polyethylene, polypropylene, polyethylene terephthalate and the like.

Having generally described various aspects of the present invention, the invention will now be more particularly described with reference to the following specific examples.

DESCRIPTION OF THE PREFERRED EMBODIMENT

The pasta spirals are fabricated by first preparing a dough in a mixer, for example, a Hobart mixer. The dough in turn is formulated by first dry mixing for about five minutes, preferably, Durum Semolina flour with an appropriate amount of soy protein, if desired, and glycerol monostearate or other dough conditioner such as Myvaplex® 600. Mixing allows the ingredients to disperse evenly in the mix and form a useful dough. Addition of the Myvaplex® 600 dough conditioner and the particulate soy fiber helps the dough to release when subsequently rolled and sheeted. Additionally, soy fiber in the mix assists in producing a more workable dough.

To this dry mixture is added a sufficient amount of water at ambient temperature to prepare the dough and mixing is continued for another six to ten minutes.

The dough thus formed is removed and run through a series of rolls, for example, a Rondo sheeter, preferably a dusting agent is employed to assist in sheeting. The thickness of the dough is reduced to a product thickness of about 55 to 65 thousandths of an inch. This rolling or sheeting helps to work the dough to a functional texture and to develop wheat protein gluten. Generally the thickness of the dough will be sufficient so that it can be further worked without ripping or tearing. Over working will break down the gluten structure and the dough will not roll properly.

The worked, pre-dusted dough is then steam cooked for about three minutes at about 8 psi steam pressure in a belt steam tunnel. The temperature in the steam tunnel is about 205° F.–212° F. This pre-gelatinizes the starch and is necessary for instant noodles. Full cooking is not required as further cooking will be done when the noodles are to be cooked and eaten in an instant or "quick cooking" manner. Steaming will also reduce the stickiness of the product. This steam pre-gelatinization gives firmer texture, gives the pasta the ability to withstand longer cooking conditions, the ability to retain texture for longer periods after cooking, helps the product to resist checking during the drying process, and allows quicker final cooking ability. It also forms a better starch matrix in the pasta.

The partially cooked or steamed dough coming out of the steam tunnel is then sprinkled with a light dusting of antistick agent such as soy protein at a level of about 0.1% to 1.00% by weight of the soy protein to the wet dough. The amount of anti-sticking agent employed is enough to prevent sticking. This dusting is critical and promotes separation and unwinding of the pasta spiral during the final cooking process. In addition, on its application to the sheet after steaming it prevents all layers from sticking together.

The dough is then dried to a moisture content of about 15% to 25% by weight. The dusted dried dough is then cut to appropriate lengths and rolled up on itself by methods well known in the art such as those shown in U.S. Pat. Nos. 2,352,617; 2,383,774 or 2,576,670 and cut into appropriate widths to make spiral noodles of a specified length. The noodles can be cut into selected widths by, for example, the methods shown in U.K. Patent 1,594,713. After cutting the spiral wound noodles, are dried at 120° F. dry bulb and 100° F. wet bulb giving a relative humidity of 49% for about 6–7 hours of drying time to a moisture of about 12% to 14%. Drying allows for long term storage. Some shrinkage of the spiral, leaving spaces between layers occurs. This allows for better separation during the cooking process.

The following examples are designed to illustrate, but not to limit, the practice of the instant invention. Unless otherwise indicated, all percentages are by weight.

EXAMPLE 1

2 lb. 8 oz. of semolina are mixed in a Hobart mixer with ½ qt. of water; 22 g. of Myvaplex® 600 (glycerol monostearate) and 17 g. of soy fiber (in dough) Fbrim® 1450.

The material after mixing is sheeted on a Rondo Sheeter and dusted with Fibrim® 1450. The sheeted dough is then steamed for three minutes at 8 lbs. pressure. The surface is dried with fans for five minutes and again dusted with soy fiber. By using a conveyor table setup with a rolling torpedo rod, the pasta sheets are rolled onto themselves. The setting of the conveyor speed along with the position of the rolling torpedo, in various angles will create and determine the size and layer spacing of the pasta roll. A cutting process will follow in timed intervals along with the progression of the roll, off the torpedo rod giving equally sized cuts.

The spiral pasta noodles thus formed are added to a dried soup mixture and loaded into flexible packaging prepared by the process of U.S. Pat. No. 5,410,857. It is expected that a flexible packaging system employing the pasta spirals of the invention will experience fewer perforations than if the noodles were not in a spiral shape.

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A method for reducing the number of perforations of flexible packaging containing dried pasta comprising:

A. preparing a dried pasta dough in a spiral to form spirally wound noodles by dry blending a flour with a dough conditioning/antisticking agent for about five minutes;

adding water to the dry blend to achieve a raw dough moisture of about 35% and mixing the water, dry blend combination to form the raw dough;

working the raw dough to achieve a functional thickness and texture;

partially cooking the raw dough for about three minutes at a temperature of about 100 degrees C. to pregelatinize the starch in the dough;

partially drying the partially cooked dough to achieve a moisture content of about 20%;

dusting the partially cooked dough with about 0.1 to 1.0% of a fibrous dusting agent to insure that the spirally wound noodles have the capability of unrolling upon cooking;

rolling the partially dried dough to form a spiral:

cutting the spiral rolled dough into an appropriate thickness to form a plurality of spiral rolled dough pasta noodles;

drying the rolled and cut dough to form the dried spiral pasta noodles whereby the spiral noodles unroll upon cooking as a result of the dusting step;

B. packing a plurality of the dried spiral noodles in a flexible package; and

C. sealing the flexible package.

2. Method as defined in claim 1 wherein the dough conditioning/antisticking agent is glyceryl monostearate.

3. Method as defined in claim 1 wherein the flexible package is fabricated from a flexible material selected from the group consisting of polyethylene, polypropylene, laminated paper/film and polyethylene terephthalate.

* * * * *